United States Patent
Smedresman et al.

(10) Patent No.: US 10,352,193 B2
(45) Date of Patent: Jul. 16, 2019

(54) BEARING CENTERING SPRING AND DAMPER

(71) Applicant: United Technologies Corporation, Farmington, CT (US)

(72) Inventors: Adam G. Smedresman, Larchmont, NY (US); Michael D. Greenberg, Bloomfield, CT (US); Todd A. Davis, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 9 days.

(21) Appl. No.: 15/679,062

(22) Filed: Aug. 16, 2017

(65) Prior Publication Data

US 2019/0055853 A1 Feb. 21, 2019

(51) Int. Cl.
| | |
|---|---|
| *F16C 27/00* | (2006.01) |
| *F01D 25/16* | (2006.01) |
| *F16C 27/04* | (2006.01) |
| *F16C 27/02* | (2006.01) |
| *F01D 25/18* | (2006.01) |
| *F16C 19/06* | (2006.01) |

(52) U.S. Cl.
CPC ......... *F01D 25/164* (2013.01); *F01D 25/186* (2013.01); *F16C 27/02* (2013.01); *F16C 27/045* (2013.01); *F16C 19/06* (2013.01); *F16C 2360/24* (2013.01)

(58) Field of Classification Search
CPC .... F01D 25/164; F01D 25/186; F16C 27/045; F16C 2360/24
See application file for complete search history.

(56) References Cited

U.S. PATENT DOCUMENTS

| 5,163,256 A | 11/1992 | Fukumoto et al. |
|---|---|---|
| 8,167,494 B2 * | 5/2012 | Gibbons ............... F01D 25/164 |
| | | 384/99 |
| 9,464,669 B2 | 10/2016 | Kerr et al. |
| 9,879,750 B2 * | 1/2018 | Husband ............... F16F 15/023 |
| 2009/0269185 A1 | 10/2009 | Spencer et al. |
| 2015/0240867 A1 | 8/2015 | Amador et al. |
| 2015/0316095 A1 * | 11/2015 | Bedenk .................. F16C 27/04 |
| | | 384/535 |
| 2016/0186607 A1 | 6/2016 | Witlicki et al. |

(Continued)

FOREIGN PATENT DOCUMENTS

| EP | 2538036 A2 | 12/2012 |
|---|---|---|
| EP | 3106685 A1 | 12/2016 |
| WO | 2006/131694 A1 | 12/2006 |

OTHER PUBLICATIONS

Bugra H. Ertas et al., Synchronous Response to Rotor Imbalance Using a Damped Gas Bearing, J. Eng. Gas Turbines Power, 132(3), 032501, Dec. 1, 2009, The American Society of Mechanical Engineers, New York, NY.

(Continued)

*Primary Examiner* — Thomas R Hannon
(74) *Attorney, Agent, or Firm* — Bachman & LaPointe, P.C.

(57) ABSTRACT

A bearing spring support/damping apparatus has: a first end portion; a second end portion; and a flexible portion between the first end portion and the second end portion, and further comprising: a single outer diameter groove in the second end portion.

18 Claims, 6 Drawing Sheets

(56) References Cited

U.S. PATENT DOCUMENTS

| | | | |
|---|---|---|---|
| 2016/0238075 A1* | 8/2016 | Clark | F16C 33/6677 |
| 2017/0122369 A1 | 5/2017 | Smedresman et al. | |
| 2017/0335767 A1* | 11/2017 | Gysling | F02C 7/06 |
| 2018/0245629 A1* | 8/2018 | Takaoka | F16C 27/045 |

OTHER PUBLICATIONS

European Search Report dated Apr. 12, 2019 for European Patent Application No. 18189389.2.

* cited by examiner

BEARING CENTERING SPRING AND DAMPER

BACKGROUND

The disclosure relates to turbomachine bearings. More particularly, the disclosure relates to turbomachine bearing centering spring/damper systems.

Turbomachines, namely, gas turbine engines (broadly inclusive of turbofans, turbojets, turboprops, turboshafts, industrial gas turbines, and the like) have numerous rolling element (ball or roller) bearing systems intervening between one or more spools and static or fixed structure (e.g., the engine case). Various spring mounting/retaining systems exist such as to accommodate tolerance of the rotating components, vibration, inertial loading due to aircraft maneuvering, and the like. The spring action may be damped by a fluidic damper (e.g. a "squeeze-film" damper which may use bearing lubrication oil as the fluid). One genus of these systems involve springs which are often referred to as "squirrel cage" springs due to their geometry. In addition to the radial spring action, depending on implementation the spring may serve to axially position the associated bearing race.

One example of a squirrel cage retainer is disclosed in U.S. Pat. No. 9,464,669 (the '669 patent) of Kerr et al., Oct. 11, 2016, the disclosure of which is incorporated by reference in its entirety herein as if set forth at length. The term "squirrel cage" relates somewhat to the hamster wheel like appearance of the spring/retainer with two full annulus end portions separated by a center portion having a circumferential array of longitudinal beams or legs joining the two end portions and separated by gaps. The circumferential array of legs and gaps provides flexibility at a desired spring rate allowing excursions of the two end portions off their coaxial condition. In the '669 patent configuration, one of the ends (the proximal end and, in the example, forward end) comprises a mounting flange for mounting to the associated structure (e.g., static structure in that example). The opposite second end portion has features for bearing engagement and fluid damping. Specifically, the inner diameter (ID) surface of the second end portion is dimensioned to receive the outer diameter (OD) surface of the associated bearing outer race. The ID surface face may bear features for also axially retain/engaging the outer race.

The OD surface of the second portion bears two annular grooves. The grooves each carry a seal (e.g., a ring seal such as a piston ring seal (e.g., metallic), an elastomeric O-ring seal, spring-loaded carbon seal, or the like). The second portion is mounted in close sliding relationship surrounded by external structure including one or more fluid ports between the two grooves/seals. Pressurized fluid (e.g., oil) is introduced via the ports. The fluid in the damping chamber formed between the grooves/seals maintains a fluid film in the region between the grooves. This thin film (the "squeeze film") provides small amounts of displacement and damping. The natural frequency of the system is a function of the effective mass of the system, spring rate, and the squeeze-film damping. The presence of the two grooves and seals renders the configuration a "closed damper" configuration (although there will be small amounts of leakage past the seals).

A more complex configuration of squirrel cage is shown in U.S. Patent Application Publication No. 2017/0122369A1 (the '369 publication) of Smedresman et al., May 4, 2017, the disclosure of which is incorporated by reference in its entirety herein as if set forth at length. The '369 publication has a retainer wherein the first end portion also engages the outer race of a different bearing. In the '369 publication configuration, the forward portion of the retainer has a fluid damping relationship with the outer race of the associated bearing in a similar way as the static structure has to the second end portion of the retainer of the '669 patent.

Yet other variations are more complicated and have more convoluted cross-sectional profiles. For example, whereas the aforementioned examples have the squirrel cage center portion extending close to straight axially between two axial end portions, other configurations having jogs or zigzags in their axial cross-section are possible. Several such variations are variations disclosed in U.S. Patent Application Publication No. 2015/0240867A1 (the '867 publication) of Amador et al., Aug. 27, 2015, the disclosure of which is incorporated by reference in its entirety herein as if set forth at length.

A further zigzag configuration is shown in U.S. Patent Application Publication 2016/0186607A1 (the '607 publication) of Witlicki et al., Jun. 30, 2016, the disclosure of which is incorporated by reference in its entirety herein as if set forth at length where a two-piece spring/damper is created by having a squirrel cage spring extending axially between one axial end portion and a second axial end portion of that spring. However, the damper is formed along a second piece having a first axial end mounted to the second axial end of the spring and having a body extending axially back towards the spring first end portion to join a second end portion bearing the grooves for the seals for the damper. Thus, the first end portion of the spring which serves for mounting may be axially very close to the second end portion of the second piece which bears the damping features. Depending upon the situation, the second piece may itself have a squirrel cage spring construction or may be relatively rigid.

A similar damper configuration is the "open damper" which lacks the two grooves/seals. See, Bugra H. Ertas et al., "Synchronous Response to Rotor Imbalance Using a Damped Gas Bearing", *J. Eng. Gas Turbines Power,* 132(3), 032501, Dec. 1, 2009, The American Society of Mechanical Engineers, New York, NY. Such a configuration allows escape of fluid from the gap between spring and static structure. A greater supply of fluid will be required in an open damper relative to a similar closed damper and the bearing will have different damping characteristics.

SUMMARY

One aspect of the disclosure involves a bearing spring support/damping apparatus comprising: a first end portion; a second end portion; and a flexible portion between the first end portion and the second end portion. There is a single outer diameter groove in the second end portion.

A further embodiment of any of the foregoing embodiments may additionally and/or alternatively include an annular seal carried by the groove.

A further embodiment of any of the foregoing embodiments may additionally and/or alternatively include the apparatus comprising a first piece and a second piece. The first end portion is a first end portion of the first piece; the second end portion is a second end portion of the second piece; the first piece has a second end portion; and the second piece has a first end portion fastened to the second end portion of the first piece.

A further embodiment of any of the foregoing embodiments may additionally and/or alternatively include the flexible portion being a flexible portion of the first piece between the first piece first end portion and the first piece second end portion.

A further embodiment of any of the foregoing embodiments may additionally and/or alternatively include the flexible portion comprising a circumferential array of longitudinal beams.

A further embodiment of any of the foregoing embodiments may additionally and/or alternatively include the first end portion, the second end portion, and the flexible portion being of a single metallic piece.

A further embodiment of any of the foregoing embodiments may additionally and/or alternatively include the first end portion comprising a radially outwardly protruding mounting flange having a plurality of mounting holes.

A further embodiment of any of the foregoing embodiments may additionally and/or alternatively include the flexible portion comprising at least one of steel and titanium alloy.

A further embodiment of any of the foregoing embodiments may additionally and/or alternatively include a turbomachine including the apparatus and further comprising: static structure having a mounting portion to which the first end portion is mounted; a shaft mounted to rotate relative to the static structure; and a bearing having an inner race mounted to the shaft and having an outer race mounted to the second end portion.

A further embodiment of any of the foregoing embodiments may additionally and/or alternatively include a seal carried by the single groove and sealing with an inner diameter surface of a sealing portion of the static structure.

A further embodiment of any of the foregoing embodiments may additionally and/or alternatively include the static structure including a further portion having an axial clearance with an end face of the second end portion.

A further embodiment of any of the foregoing embodiments may additionally and/or alternatively include the axial clearance being less than a radial clearance between the second end portion and the inner diameter surface of the sealing portion.

A further embodiment of any of the foregoing embodiments may additionally and/or alternatively include the axial clearance being less than a radial clearance between the second end portion and the inner diameter surface of the sealing portion.

A further embodiment of any of the foregoing embodiments may additionally and/or alternatively include one of the end face and the further portion having annular grooves to form a labyrinth seal with the other.

A further embodiment of any of the foregoing embodiments may additionally and/or alternatively include each of the end face and the further portion has annular lands and grooves interdigitated with the annular lands and grooves of the other.

A further embodiment of any of the foregoing embodiments may additionally and/or alternatively include the turbomachine being a gas turbine engine.

A further embodiment of any of the foregoing embodiments may additionally and/or alternatively include a method for using the turbomachine. The method comprises: introducing a fluid to a radial clearance between the second end portion and the inner diameter surface of the sealing portion.

A further embodiment of any of the foregoing embodiments may additionally and/or alternatively include a portion of the fluid leaking through the axial clearance.

A further embodiment of any of the foregoing embodiments may additionally and/or alternatively include an amount of the leakage being less than a leakage past the seal.

A further embodiment of any of the foregoing embodiments may additionally and/or alternatively include the leakage being past a labyrinth seal.

A further embodiment of any of the foregoing embodiments may additionally and/or alternatively include a portion of the fluid leaking through the axial clearance.

Another aspect of the disclosure involves a machine comprising: a first member; a bearing; and a bearing spring support/damping apparatus. The apparatus comprises: a first end portion; a second end portion having an inner surface mounting the bearing and an outer surface radially inward of an inner surface of the first member; and a flexible portion between the first end portion and the second end portion. A seal seals between the outer surface of the second end portion and the inner surface of the first member to a first axial side of a fluid outlet in the inner surface of the first member to form a damper in the absence of a seal between the outer surface of the second end portion and the inner surface of the first member to a second axial side of a fluid outlet axially opposite the first side.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

An initial example of a spring/damper is disclosed as a modification of one of the aforementioned two-piece zigzag section spring/dampers. The identification of two pieces does not mean only two pieces but rather two main pieces. As is discussed below, there are additional fasteners and the like involved.

Figure 1:
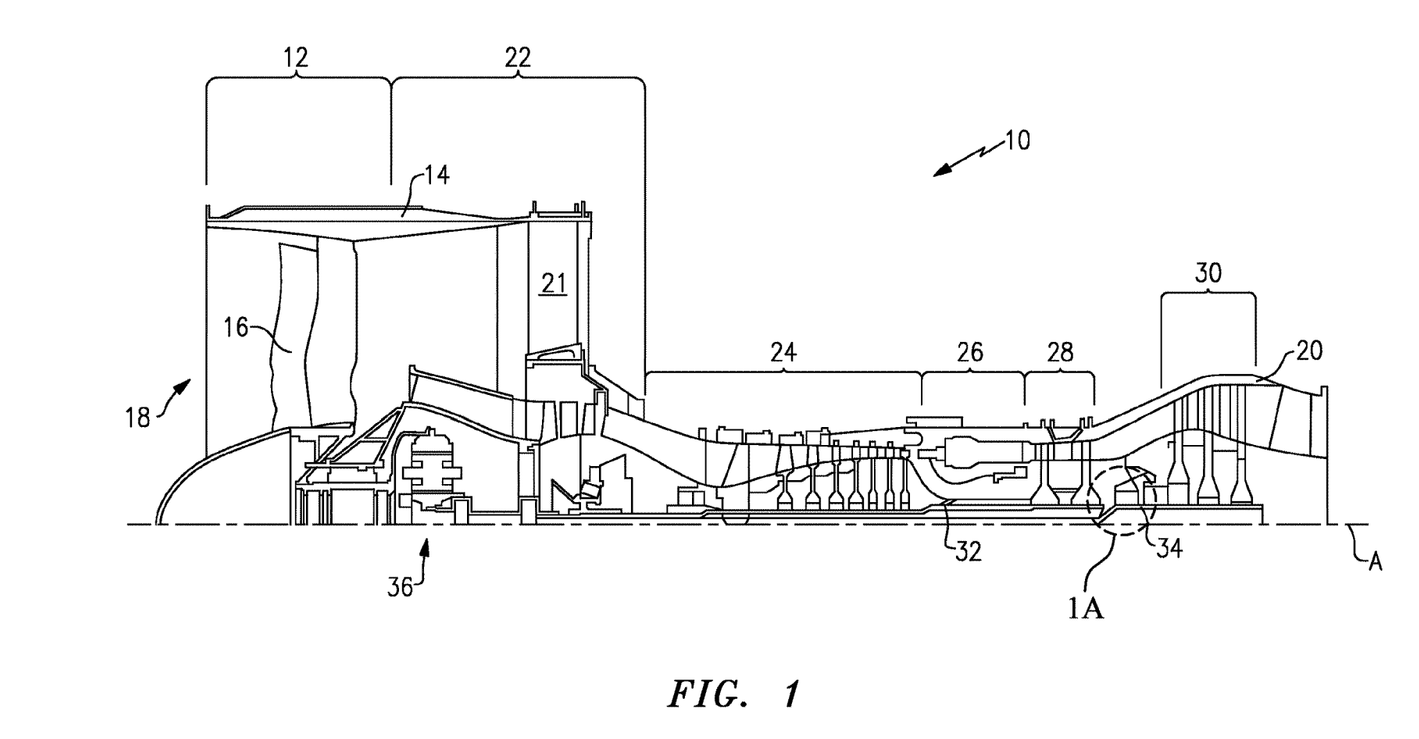
FIG. 1 is a simplified central axial sectional half view of a gas turbine engine.

FIG. 1 shows an exemplary simplified gas turbine engine 10 taken from U.S. Patent Application Publication 20110286836 (the '836 patent) of Davis, Nov. 24, 2011, the disclosure of which is incorporated herein by reference as if set forth at length. Engine 10 includes a fan section 12 within a fan case 14. The fan section 12 includes multiple blades 16 at an inlet 18 of the fan case 14. A core 20 is supported relative to the fan case 14 such as by flow exit guide vanes 21. The core 20 includes a low pressure compressor section 22, a high pressure compressor section 24, a combustor section 26, a high pressure turbine section 28 and a low pressure turbine section 30. In one example, the blades of the low pressure compressor section 22 and low pressure turbine section 30 are supported on a low spool 34 rotatable about an axis A. An epicyclic fan drive gear system (FDGS) 36 couples the low spool rotor to the fan shaft to drive the fan. The blades of the high pressure compressor section 24 and high pressure turbine section 28 are supported on a high spool 32 rotatable about the axis A.

Figure 1A:
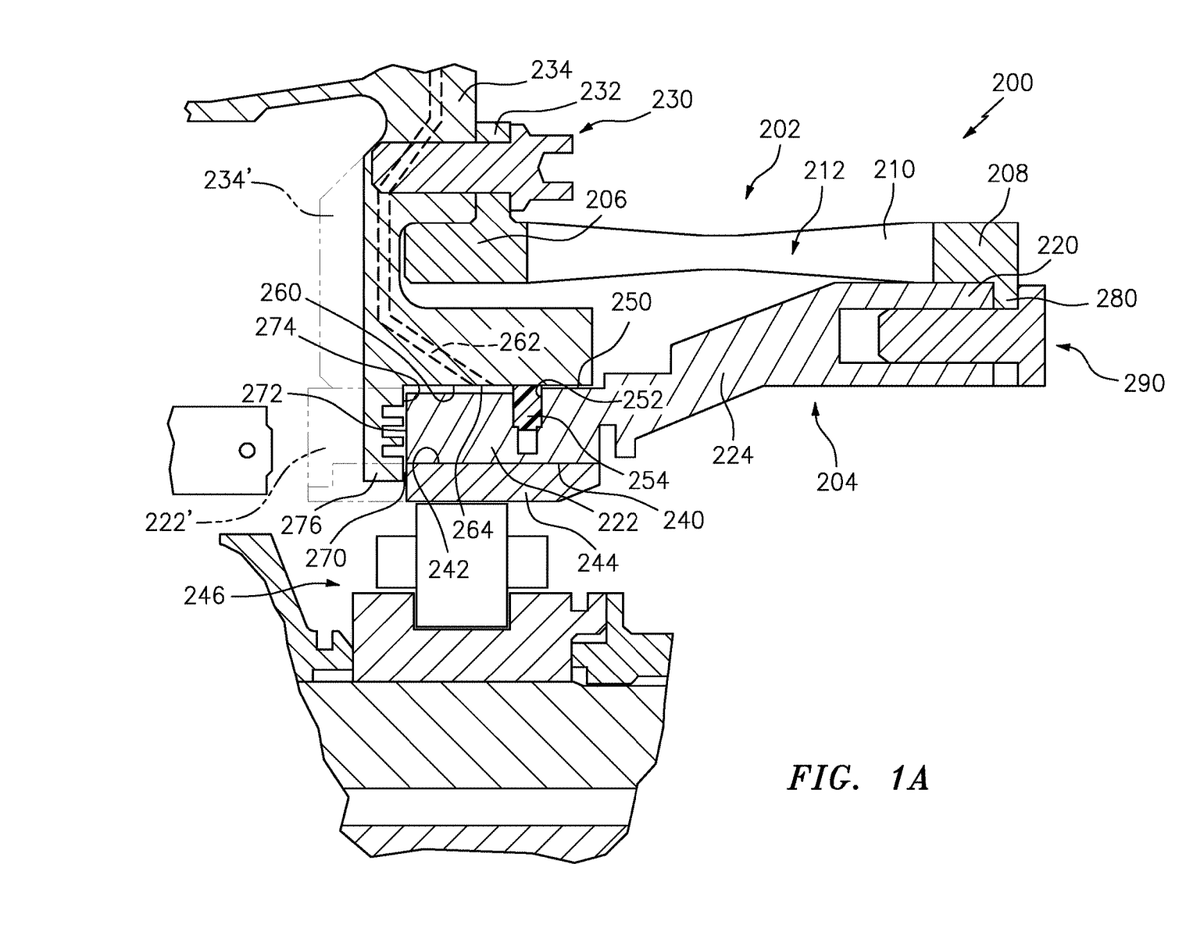
FIG. 1A is an enlarged view of a bearing area of the engine of FIG. 1.
Figure 2:
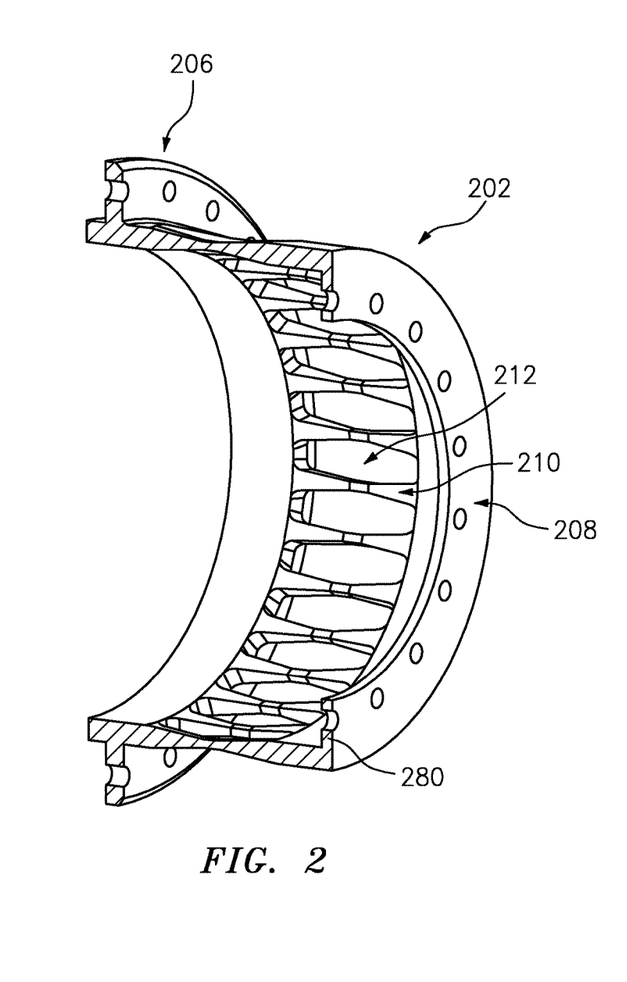
FIG. 2 is a view of a spring piece of the centering spring/damper of FIG. 1A.
Figure 3:
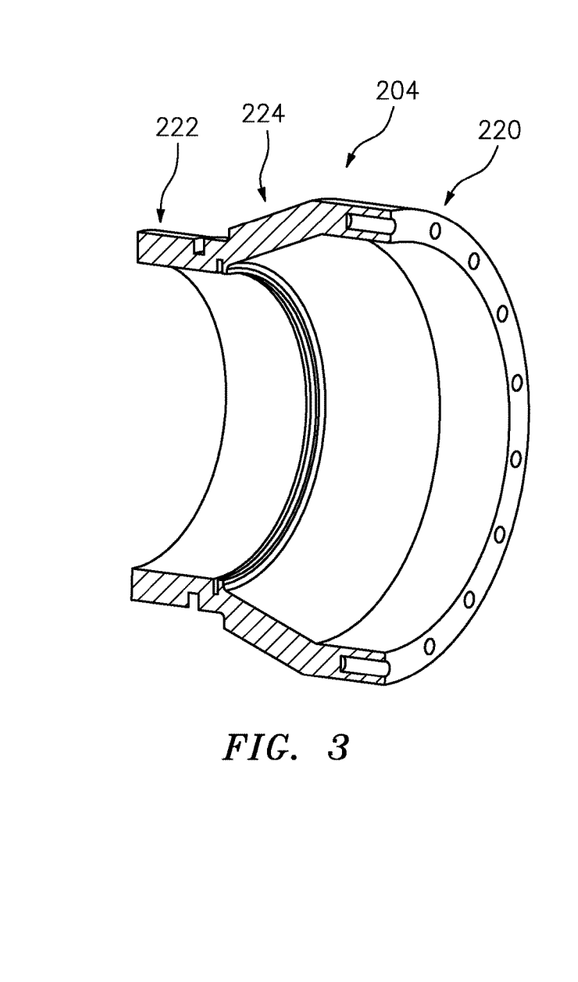
FIG. 3 is a view of a damper piece of the centering spring/damper of FIG. 1A.

FIG. 1A shows one of the main bearings of the engine. FIG. 1A specifically shows a spring/damper system 200 having a first piece 202 (also FIG. 2) and a second piece 204 (also FIG. 3). The first piece has a first annular end portion 206 (FIG. 1A) and an axially opposite second axial end portion 208. In between, a squirrel cage spring portion is formed by legs 210 and associated gaps 212. The second piece 204 comprises a first end portion 220 and a second end portion 222. An intermediate portion 224 extends between the end portions 220 and 222 and may be full annulus or segmented or may otherwise have apertures (see '607 publication) such as for passing fluid lines (e.g., for bearing lubricant) and the like. In the exemplary embodiment, the second piece 204 is relatively rigid compared to the flexibility offered the first piece by its squirrel cage legs 210. As is discussed further below, the first piece first end portion 206 is a proximal portion mounted to static engine structure (e.g., the case) such as via an array of fasteners 230 (e.g., screws) extending through a flange 232 of the first end portion 206 and into an associated flange 234 of the case.

The second piece 204 second end portion 222 is a distal portion having an inner diameter (ID) face 240 engaging and receiving the outer diameter (OD) face 242 of the outer race 244 of the rolling element bearing 246. The inner diameter (ID) race of the bearing 246 may be mounted to the outer diameter (OD) surface of a shaft.

The outer diameter (OD) surface 250 (FIG. 1A) of the second end portion 222 bears a groove 252 carrying a seal 254 (as discussed above). The seal engages the inner diameter (ID) surface 260 of a portion of the static structure. A fluid passageway 262 in the static structure has an outlet 264 to the surface 260 ahead of the seal 254.

As is so-far described, the system represents one example of a baseline system. However, the baseline system also has the second groove/seal discussed above so that the two grooves/seals define a closed damper damping chamber axially spanning/surrounding the port 264 from the passageway 262. The FIG. 1A embodiment lacks such a second groove/seal so as to create a hybrid of an open damper configuration and a closed damper configuration. Instead, there is a gap 270 between an axial end 272 of the end portion 222 and an associated surface 274 of a portion 276 of the static structure (e.g., a radially inboard wall portion added to the baseline flange 234). The elimination of the second groove relative to the baseline allows reduction in the axial length of the end portion 222 which may, in turn, allow reduction in the axial length of the engine. For example, FIG. 1A shows, in broken line, the extent of a baseline structure 234' and baseline retainer distal portion 222'. These protrude substantially beyond the revised corresponding portions 234 and 222. The saved space may be utilized in a further modification to shorten the engine, shifting the portion 234 forward relative to the structure immediately ahead of it.

The gap 270 may be an axial gap between two purely radial surfaces and may have a length that is smaller than the centered radial clearance between the surfaces 250 and 260. The small size of the clearance 270 may resist fluid flow and thus partially make up for the removed seal. In further variations, one or both radial faces along the gap 270 may have annular grooves to form a labyrinth seal to help prevent leakage of the damper fluid.

At least for a mid-thrust gas turbine engine, exemplary centered radial clearance forming the radial gap is greater than zero and up to 20 mils (0.5 mm) (e.g. (1.0 mil to 20 mils (25 micrometer to 0.5 mm) or 5.0 mils to 20.0 mils (0.13 mm to 0.5 mm) or 5.0 mils to 10.0 mils (0.13 mm to 0.25 mm)). An exemplary axial clearance of the gap 270 is less than the centered radial clearance. An exemplary axial clearance is from more than zero to 20 mils (0.5 mm), more narrowly (1.0 mil to 10 mils (25 micrometer to 0.25 mm) or 2.0 mils to 5.0 mils (51 micrometer to 0.13 mm)). However, in general one would seek to minimize the axial gap while tuning the radial gap for damping.

FIG. 1A additionally shows the mounting of the two pieces to each other. In this example, the second end portion 208 of the first piece 202 has a flange 280 having a hole circle. The forward face of the flange 280 abuts the aft face of the first end portion 220 of the second piece 204. The first end portion 220 has a circle of threaded bores complementary to the holes of the flange to respectively receive threaded fasteners 290 (e.g., screws) to secure the two together.

Figure 4:
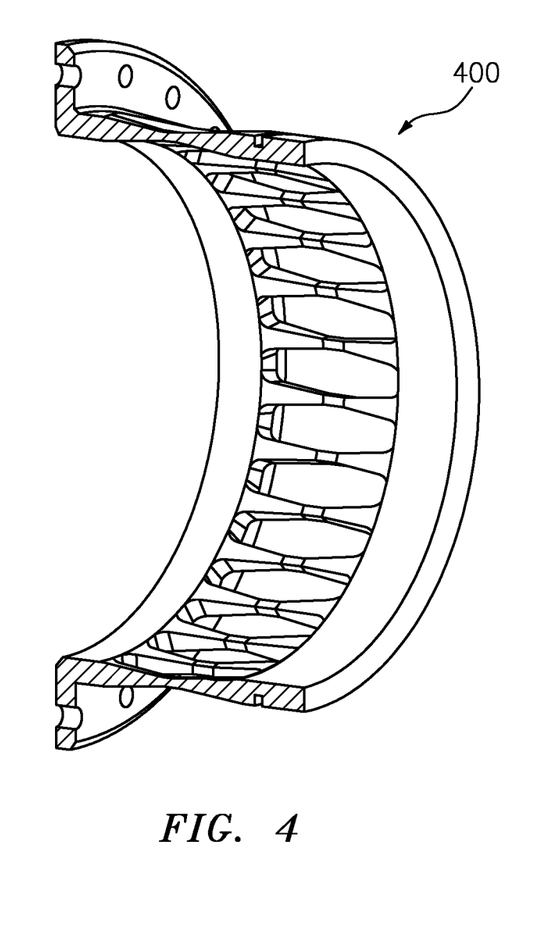
FIG. 4 is a view of an alternative single-piece spring/damper.
Figure 5:
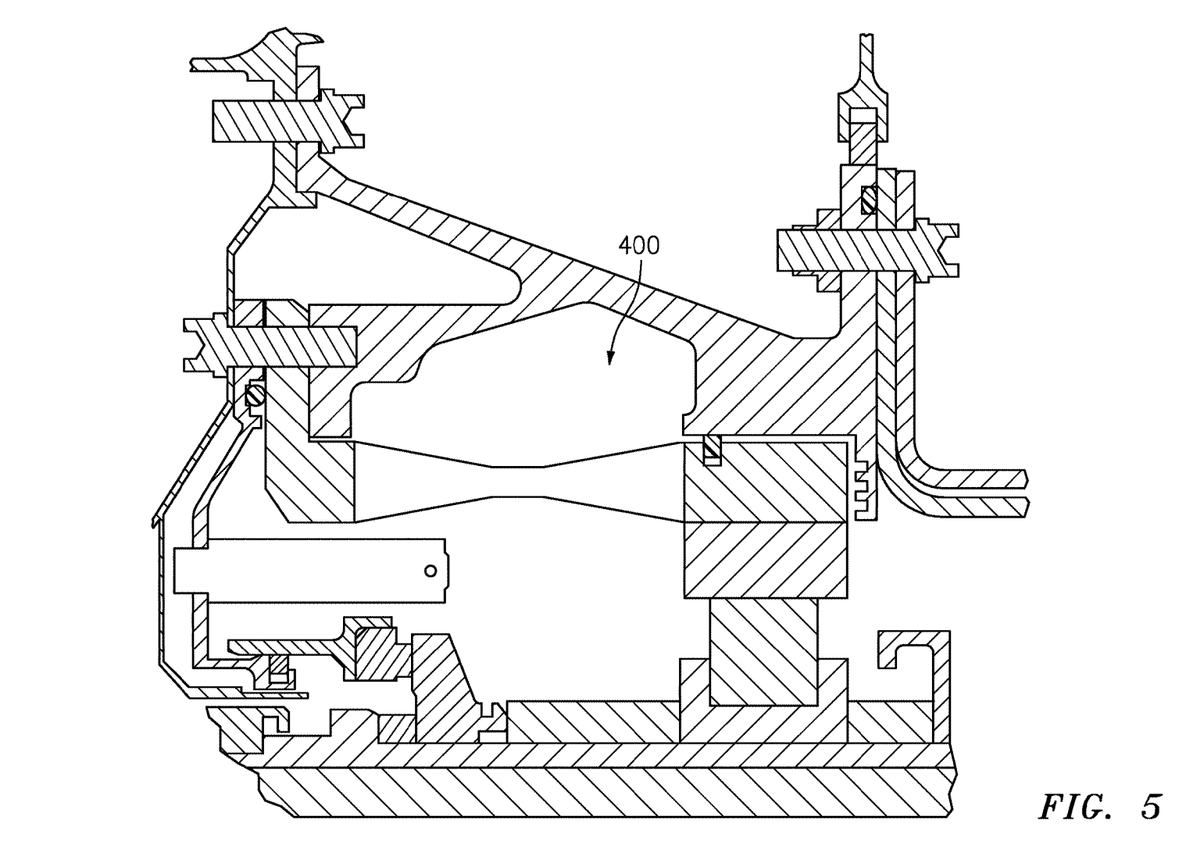
FIG. 5 is a partial central axial sectional view of the FIG. 4 spring/damper in an engine.

FIG. 4 shows a single-piece spring/damper 400 such as may be used in systems such as the '669 publication (see, also, configuration illustrated, but not discussed, in U.S. Pat. No. 8,439,637). FIG. 5 shows the spring/damper 400 installed in an engine with similar interfaces to similar features to that of the spring/damper of FIG. 1A.

Figure 6:
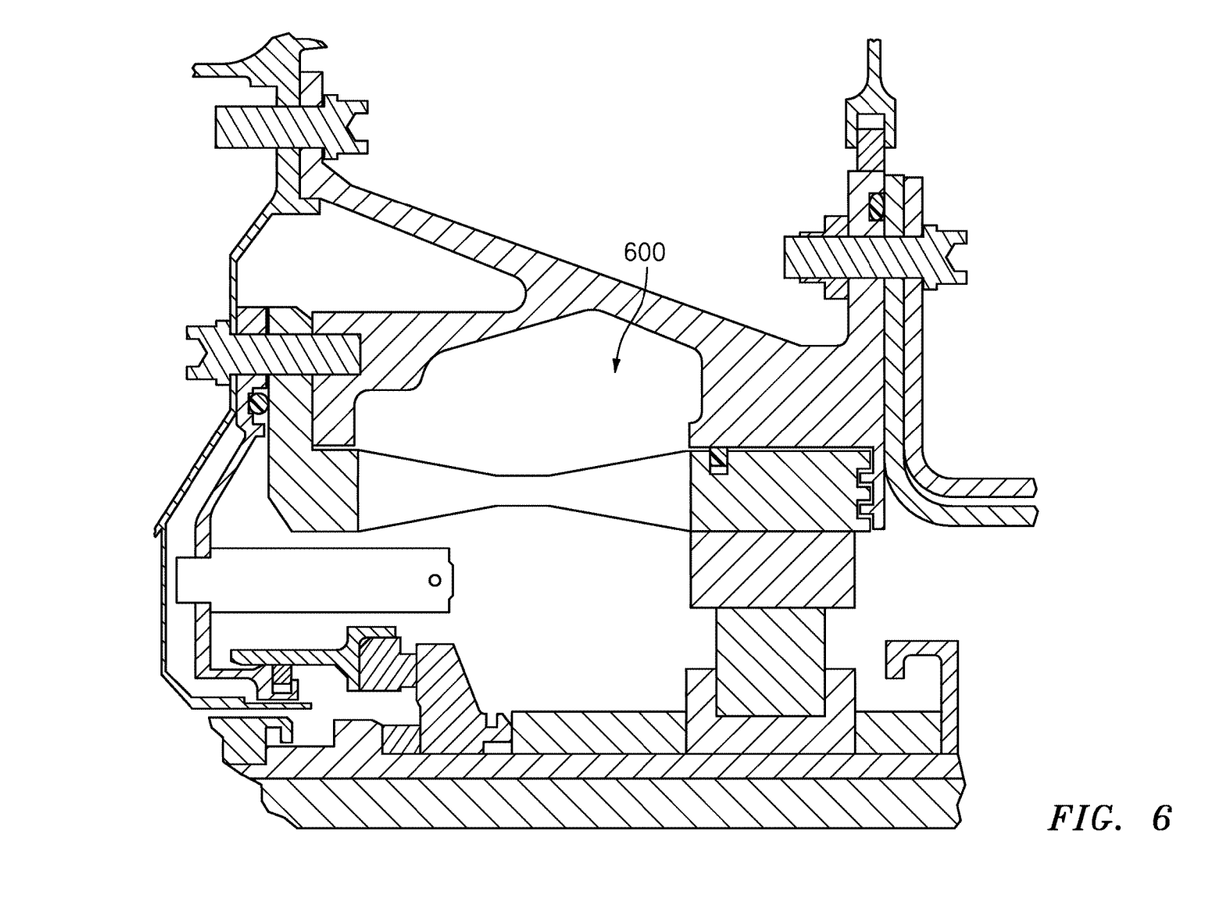
FIG. 6 is a partial central axial sectional view of another spring/damper in an engine.

FIG. 6 shows a further variation where a spring/damper 600, otherwise similar to the spring/damper 400, has labyrinth features on both the distal end face and the adjacent static structure face. In this particular example, the labyrinth features are axially overlapping and radially interdigitated. In such an example, there is a neutral/centered radial clearance between the seal lands of the two members that is at least the radial clearance between the distal portion (damper section) OD surface of the spring/damper 600 and the adjacent static structure ID surface.

Accordingly, it is seen that when implemented as a modification of a baseline (e.g., prior art such as those referenced above) configuration, the foregoing teachings may be implemented at various levels. A first order modification is simply to remove one of the two channels/grooves while leaving the other.

There may be many second order or beyond modifications. For example, one such modification involves adding the static structure wall 276 adjacent the end of the distal end portion 222 if not already present. Another involves shortening the distal end portion.

Another second order modification involves lengthening the legs/beams. For example the beam increase may partially offset the decrease in distal end portion 222 length (and is thus particularly relevant in single-piece constructions). Lengthening the beams may reduce their strains at a given deflection of the distal end portion and thus may reduce stress and improves service life. Lengthened beams may be thickened to maintain spring rate.

Another second order modification involves repositioning the remaining groove. For example, one might shift the groove to maintain length of the squeeze film. This might involve shifting the remaining groove toward the distal end. In such a case, this opens up further ability to lengthen the beam and gaps (see discussion immediately above) to further optimize spring performance. Third order modifications involve making use of the longitudinal space savings and modifying adjacent structure or even shortening the engine overall.

Manufacture may be by conventional materials and techniques (e.g., machining the spring and damper piece or pieces from alloys such as steels or titanium alloys such as on a lathe followed by hole drilling/tapping in a rotary fixture).

Further variations include alternative mounting means for mounting the spring (e.g., relative to engine static structure). Alternatives to the circumferential array of fastener holes in a flange include securing the proximal end portion via a large nut circumscribing the engine axis or welding the proximal end portion to the static structure. Among further variations are springs where the legs are separately formed from the end portions they are then secured to.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A turbomachine comprising:
   a bearing spring support/damping apparatus comprising:
      a first end portion;
      a second end portion having a single outer diameter groove; and
      a flexible portion between the first end portion and the second end portion;
   a static structure having a mounting portion to which the first end portion is mounted;
   a seal carried by the single groove and sealing with an inner diameter surface of a sealing portion of the static structure, wherein:
      the static structure includes a further portion having an axial clearance with an end face of the second end portion; and
      at least one of the end face and the further portion has annular grooves to form a labyrinth seal with the other;
   a shaft mounted to rotate relative to the static structure; and
   a bearing having an inner race mounted to the shaft and having an outer race mounted to the second end portion.

2. The turbomachine of claim 1 wherein:
   the apparatus comprises a first piece and a second piece;
   the first end portion is a first end portion of the first piece;
   the second end portion is a second end portion of the second piece;
   the first piece has a second end portion; and
   the second piece has a first end portion fastened to the second end portion of the first piece.

3. The turbomachine of claim 2 wherein:
   the flexible portion is a flexible portion of the first piece between the first piece first end portion and the first piece second end portion.

4. The turbomachine of claim 1 wherein:
   the flexible portion comprises a circumferential array of longitudinal beams.

5. The turbomachine of claim 1 wherein:
   the first end portion, the second end portion, and the flexible portion are of a single metallic piece.

6. The turbomachine of claim 1 wherein:
   the first end portion comprises a radially outwardly protruding mounting flange having a plurality of mounting holes.

7. The turbomachine of claim 1 wherein:
   the flexible portion comprises at least one of steel and titanium alloy.

8. The turbomachine of claim 7 wherein:
   the axial clearance is less than a radial clearance between the second end portion and the inner diameter surface of the sealing portion.

9. The turbomachine of claim 1 wherein:
   the axial clearance is less than a radial clearance between the second end portion and the inner diameter surface of the sealing portion.

10. The turbomachine of claim 1 wherein:
    only one of the end face and the further portion has said annular grooves to form said labyrinth seal with the other.

11. The turbomachine of claim 1 wherein:
    each of the end face and the further portion has annular lands and said annular grooves interdigitated with the annular lands and annular grooves of the other.

12. The turbomachine of claim 1 being a gas turbine engine.

13. A method for using the turbomachine of claim 1, the method comprising:
    introducing a fluid to a radial clearance between the second end portion and the inner diameter surface of the sealing portion.

14. The method of claim 13 wherein:
    a portion of the fluid leaks through the axial clearance.

15. The method of claim 14 wherein:
    an amount of the leakage is less than a leakage past the seal.

16. The method of claim 13 wherein:
    a portion of the fluid leaks through the axial clearance.

17. A machine comprising:
    a first member;
    a bearing;
    a bearing spring support/damping apparatus comprising:
       a first end portion;
       a second end portion having an inner surface mounting the bearing and an outer surface radially inward of an inner surface of the first member; and
       a flexible portion between the first end portion and the second end portion,
    wherein:
       a labyrinth seal is formed between an end of the second end portion and the first member; and
       a seal seals between the outer surface of the second end portion and the inner surface of the first member to a first axial side of a fluid outlet in the inner surface of the first member to form a damper, in the absence of a seal between the outer surface of the second end portion and the inner surface of the first member to a second axial side of a fluid outlet axially opposite the first side.

18. A turbomachine comprising:
- a bearing spring support/damping apparatus comprising:
  - a first end portion;
  - a second end portion having a single outer diameter groove; and
  - a flexible portion between the first end portion and the second end portion;
- a static structure having a mounting portion to which the first end portion is mounted;
- a seal carried by the single groove and sealing with an inner diameter surface of a sealing portion of the static structure, wherein:
  - the static structure includes a further portion having an axial clearance with an end face of the second end portion; and
  - the axial clearance is less than a radial clearance between the second end portion and the inner diameter surface of the sealing portion;
- a shaft mounted to rotate relative to the static structure; and
- a bearing having an inner race mounted to the shaft and having an outer race mounted to the second end portion.

* * * * *